United States Patent
Mack

(10) Patent No.: US 6,831,637 B1
(45) Date of Patent: Dec. 14, 2004

(54) METHOD AND APPARATUS FOR COMPRESSING THREE DIMENSIONAL SURFACE DATA

(75) Inventor: Walter J. Mack, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/476,383

(22) Filed: Dec. 30, 1999

(51) Int. Cl.[7] ............................................. G06T 15/00
(52) U.S. Cl. ..................................................... 345/419
(58) Field of Search ................................ 345/419, 423, 345/441, 442, 443, 552; 382/232, 244, 246

(56) References Cited

U.S. PATENT DOCUMENTS

| | | | |
|---|---|---|---|
| 5,517,611 A | * | 5/1996 | Deering ...................... 345/522 |
| 5,553,206 A | * | 9/1996 | Meshkat ...................... 345/423 |
| 5,936,869 A | * | 8/1999 | Sakaguchi et al. .......... 364/578 |
| 6,088,715 A | * | 7/2000 | Oberman ..................... 708/505 |
| 6,167,159 A | * | 12/2000 | Touma et al. ................ 382/242 |
| 6,172,683 B1 | * | 1/2001 | Bloomfield ................. 345/441 |
| 6,304,275 B1 | * | 10/2001 | Dyer ........................... 345/581 |

OTHER PUBLICATIONS

"Microsoft Corp. Announces License of MetaStream 3–D Technology From MetaCreations", MetaStream, Jun. 2, 1998, pp. 1–8 (http://www.metastream.com/about/press.html).

* cited by examiner

Primary Examiner—Don Wong
Assistant Examiner—Huedung X. Cao
(74) Attorney, Agent, or Firm—Sharmini N. Green

(57) ABSTRACT

A method for processing a three-dimensional (3D) graphic object, having the first step of converting a set of vertices for the 3D graphics object. Further, decomposing the 3D graphics object into a set of segments; and for each segment: (1) extracting a set of vertex coordinates; and (2) subtracting the set of vertex coordinates from a previously determined set of vertex coordinates to produce a set of encoded vertex coordinates. Then, compressing the set of encoded vertex coordinates. An apparatus for performing the method.

20 Claims, 7 Drawing Sheets

METHOD AND APPARATUS FOR COMPRESSING THREE DIMENSIONAL SURFACE DATA

FIELD OF THE INVENTION

This invention is related to the field of use of data compression. More particularly, this invention is directed to a method and apparatus for compressing three dimensional surface data.

BACKGROUND

Three-dimensional (3D) object models have a sense of depth that is lacking in two-dimensional (2D) object models. Another advantage of 3D models is that the models may be viewed from many different angles, thus, the combination of the advantages provide the models with a sense of virtual reality. In so providing, the viewer gets a better "feel" of the object than would otherwise be possible with a 2D model of the object. Accordingly, the commercial viability of 3D object models is remarkably pronounced in the entertainment, advertisement and simulation industries. According to one example, with the growing popularity of Internet, in one area, it may be desirable to provide 3D on-line experience of advertised products, computer games, animated videos, 3D models of real objects and so forth.

However, one drawback is the enormous amount of information that needs to be transmitted from a server location to a client location to provide the 3D experience. 3D information is generally stored in several subparts. For example, the first subpart may be a cloud of points in 3D space, each point having a X, Y, Z coordinate in a 3D coordinate system. The second subpart may be a list of "faces." For example, a face may be a triangle with its vertices being three of the cloud of points in the 3D space. The formation of the faces may form the 3D structure of the modeled object. Yet a third subpart may contain surface information such as material, color and texture of the object associated with the faces. Thus, an enormous amount of information typically has to be processed for each set of 3D objects. Consequently bandwidth constraints of the communication channel between a server and a client may be a factor when the models have to be transferred. In addition, the amount of information that needs to be stored also requires significant resources.

SUMMARY OF THE INVENTION

One embodiment of the invention is a method for processing a three-dimensional (3D) graphics object. A set of vertices for the 3D graphics object are converted. The 3D graphics object is then decomposed into a set of segments. A set of vertex coordinates is extracted for each segment and the set of vertex coordinates is subtracted from a previously determined set of vertex coordinates to produce a set of encoded vertex coordinates. Finally, the set of encoded vertex coordinates is compressed. An apparatus for performing the method is also disclosed.

BRIEF DESCRIPTION OF THE DRAWINGS

The system is illustrated by way of example and not limitation in the figures of the accompanying drawings in which like references indicated similar elements and in which.

DETAILED DESCRIPTION OF THE INVENTION

Data compression, in general, is the taking of a stream of information that may be of a fixed length of bits and transforming the information into codes that may later be decoded back to its original form. If the compression is successful, the resulting number of bits in the codes would be less than what it would have required had the information been sent in its original bits. In one example of data compression, the probabilities of the various occurrences of the information bits are predetermined. Based on those probabilities, the information bits are appropriately coded. This is possible when the probability that a particular value for the data point occurs is non-uniform over all possible values. Two systems are Huffman coding and arithmetic coding. In practice, many compression algorithms will reformat the value sets such that the probability of a data point value becomes higher the closer it is to 0.

For example, if a text passage is to be compressed, a determination is made as to the occurrence of the various alphabetic characters that comprise the text. Normally, each character may be resembled by 5 bits. However, knowing that the occurrence of vowels such as "e" are more frequent for characters such as "z", "e" may be represented by a single bit, while "z" may be represented by five bits. By using fewer bits to represent information with higher occurrences and coding the bits, data compression is achieved.

The present invention performs compression on 3D data by reformatting the information bits that represent the 3D object—in particular the 3D vertices—into a format such that the probability of certain data points occurring is high. In other words, when using a certain code for data compression, a vertex that has a very high probability of occurrence generates a code with very few bits.

Figure 1:
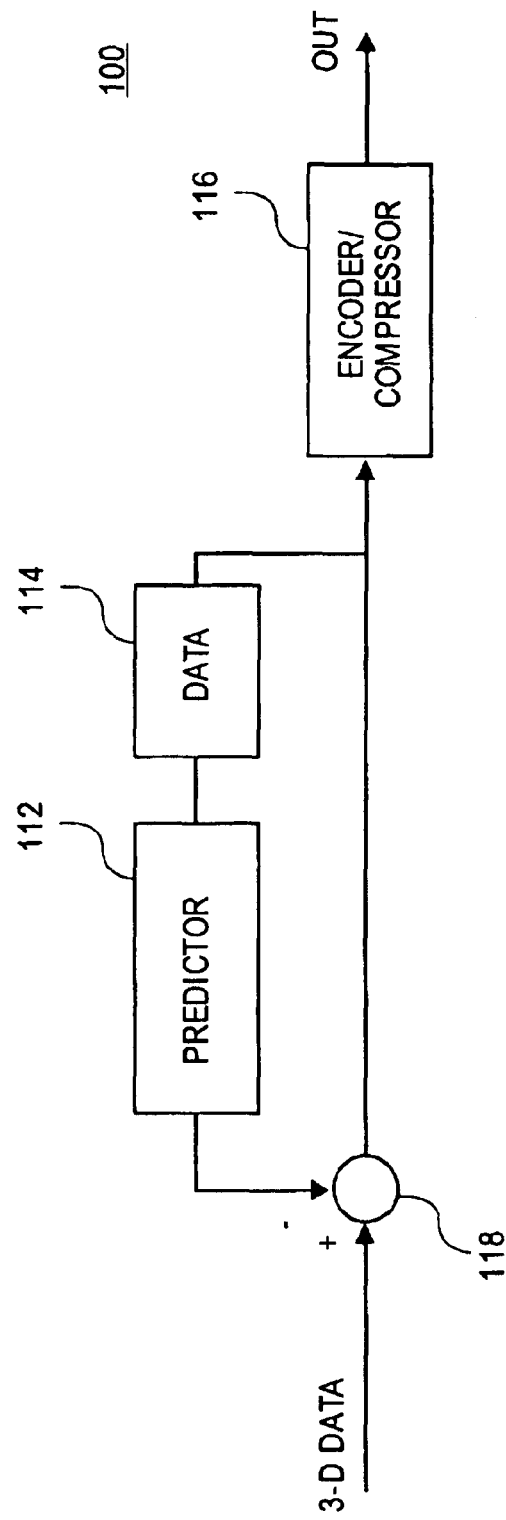
FIG. 1 is a block diagram of a compression machine configured in accordance with one embodiment of the present inventention.

FIG. 1 illustrates one embodiment of a compression machine 100. The compression machine 100 includes a predictor 112, a data block 114, an encoder/compressor 116, and a combination unit 118.

The principal behind the invention is to reformat the information bits that represent the 3-D image, in particular the 3-D vertices, into a format such that the probability of a certain data points occurring is high. In other words, when using a certain code for data compression, a vertex that has a very high probability of occurrence generates a code with very few bits. As shown in FIG. 1, the 3-D image compression machine includes predictor 112 for modeling the information bits and an encoder/compressor 116 to encode and compress the model.

According to one embodiment of the invention, predictor 112 performs the modeling of the image by first ascertaining the shape of the image. The image in many instances may have a plurality of shapes. In such instances, each of the individual shapes are ascertained individually and modeled individually. In one embodiment, certain coordinate information is retained as to the location of the shapes such that the shapes may be placed in its original position during reconstruction on the receiving end of the system. For purposes of describing the embodiment of the invention, a cylinder will be used. Once it has been ascertained that the 3-D shape to be compressed is approximately cylindrical, the predictor 12 is programmed to operate in cylindrical coordinates. For example, cylindrical coordinates may be radius, longitude and latitude (r, long., lat.).

Figure 2:
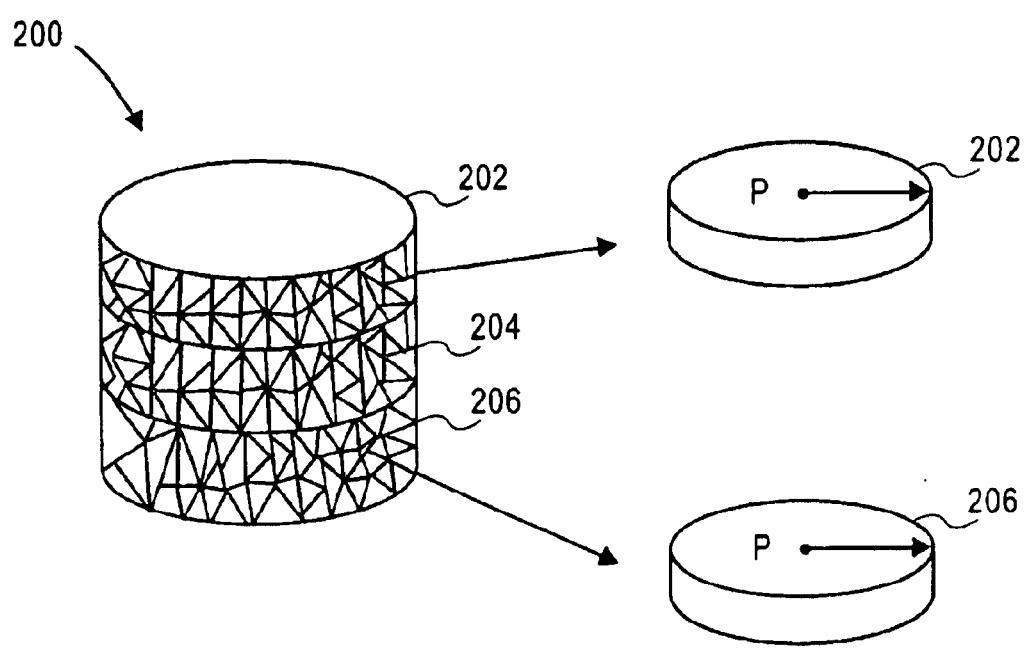
FIG. 2 illustrates a three-dimensional (3D) graphics cylinder divided in accordance with one embodiment of the present invention.

The 3D vertex pool corresponding to the cylindrical image is converted from floating points into integer values. According to one embodiment, a value of sixty-four bits is used although any number of bits may be used so long as the number of bits are able to represent all the floating points in the 3D vertex pool. Once the floating points are converted into integer values, the cylinder is "sliced" into a plurality of segments. Each segment width is determined a priori according to some criteria. For example, the segment may be of a width such that there is a constraint as to the amount of deviation of the longitude of the cylindrical coordinate. An exemplary segmentation of a cylinder 200 is shown in FIG. 2, where cylinder 200 has been divided into a first cylinder 202, a second cylinder 204, and a third cylinder 206.

Once the individual shapes are modeled by predicator 112, compression machine 100 of FIG. 1 compresses the shapes individually with encoder/compressor 116. Encoders such as Huffman coding and arithmetic coding may be used to encode the model. Each segment, is treated separately for purposes of data compression. For each segment, a point P is selected in which the surface of the segment is accessible by the point. Stated differently, no points on the surface should be obscured from the selected point P. Further, point P should be positioned such that the point is approximated located at the center of the cylindrical segment.

Figure 3:
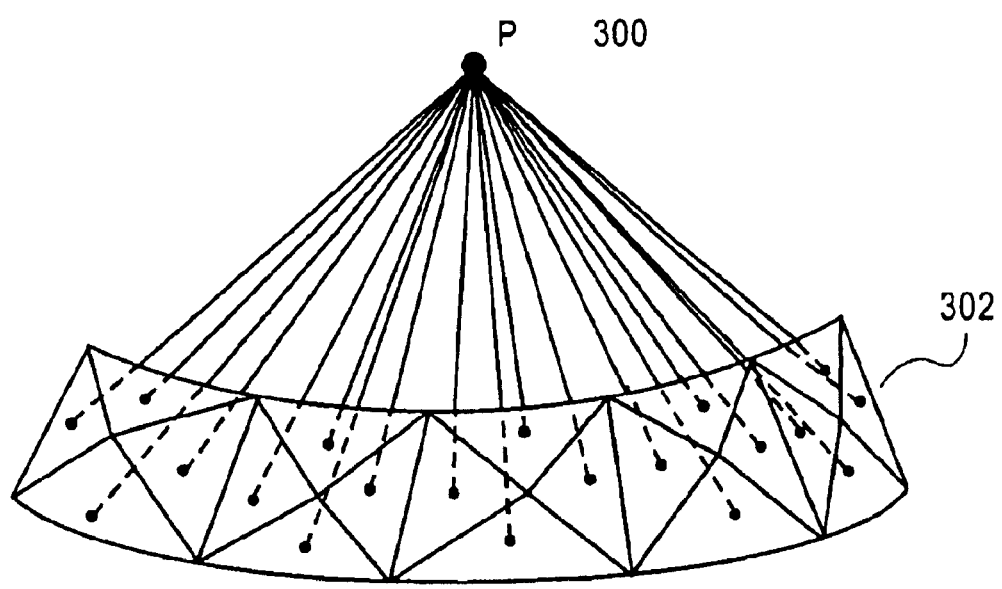
FIG. 3 illustrates a segment of the 3D graphics cylinder that has a set of faces as determined by one embodiment of the present invention.

FIG. 3 shows how a point P 300 may be determined. On the surface of a segment 302, a plurality of faces are selected that are evenly distributed in the segment (the segment is composed of faces defined by the 3-D list). The center of the face is determined from which an axis normal to the face is projected mathematically. A point or locale in which a reasonable number of axes converge or concentrate is selected as point P 300. Once point P 300 is selected, the coordinates (r, longitude, latitude) of a selected vertex is used as an initial value of the predictor 112.

For purposes of understanding the invention, the selected vertex (vertex 1) is assumed to be at (5, 20, 25). From the coordinates of vertex 1, the surface of the segment is swept longitudinally and latitudinally for vertices located on the surface of the segment and formatted in a manner suitable for compression. Table 1, below in conjunction with FIG. 1 is used to describe the formatting process.

TABLE 1

| Vertex | Original [r, lat., long.] | Processed [r, lat., long.] |
|---|---|---|
| Vertex 1 | 5, 20, 25 | n/a |
| Vertex 2 | 5.5, 20, 26 | 0.5, 0, 1 |
| Vertex 3 | 6, 21, 26.5 | 0.5, 1, 0.5 |

TABLE 1-continued

| Vertex | Original [r, lat., long.] | Processed [r, lat., long.] |
|---|---|---|
| Vertex 4 | 5, 19, 27.5 | −1, −2, 1 |
| Vertex 5 | 5, 20, 28.5 | 0, 1, 1 |
| ... | ... | ... |

Referring to FIG. 1, the coordinates (5, 20, 25) is initially stored in the predictor 112. The surface of the segment is then sweeped until another vertex (vertex 2) is encountered. Assuming that vertex 2 is (5.5, 20, 26), compression machine 100 then subtracts vertex 2 from vertex 1 using combination unit 118 to generate (0.5, 1, 0.5) which is stored. Vertex 2 then replaces vertex 1 in the predictor 112. The sweep resumes until vertex 3 is encountered. Vertex 3's coordinate (6, 21, 26.5) is subtracted from vertex 2 to generate (0.5, 1, 0.5), which is stored. Vertex 3 now replaces vertex 2 in the predictor. The process repeats until all the vertices in the segment are encountered and reformatted in the manner described above. Note that coordinates of the vertices have certain repetitive values. Using encoder/compressor 116 based on Huffman coding, for example, the reformatted coordinates may be compressed and transmitted using less bandwidth and storage space than the raw coordinates of the vertices.

The modeling, encoding and compression is applied to all segments of the cylinder. The coordinates of the point P in each segment and the selected point in each segment that is used as the initial value for the predictor may then be used in a decompression machine at the user's system, for example, to decompress the compressed data.

Figure 4:
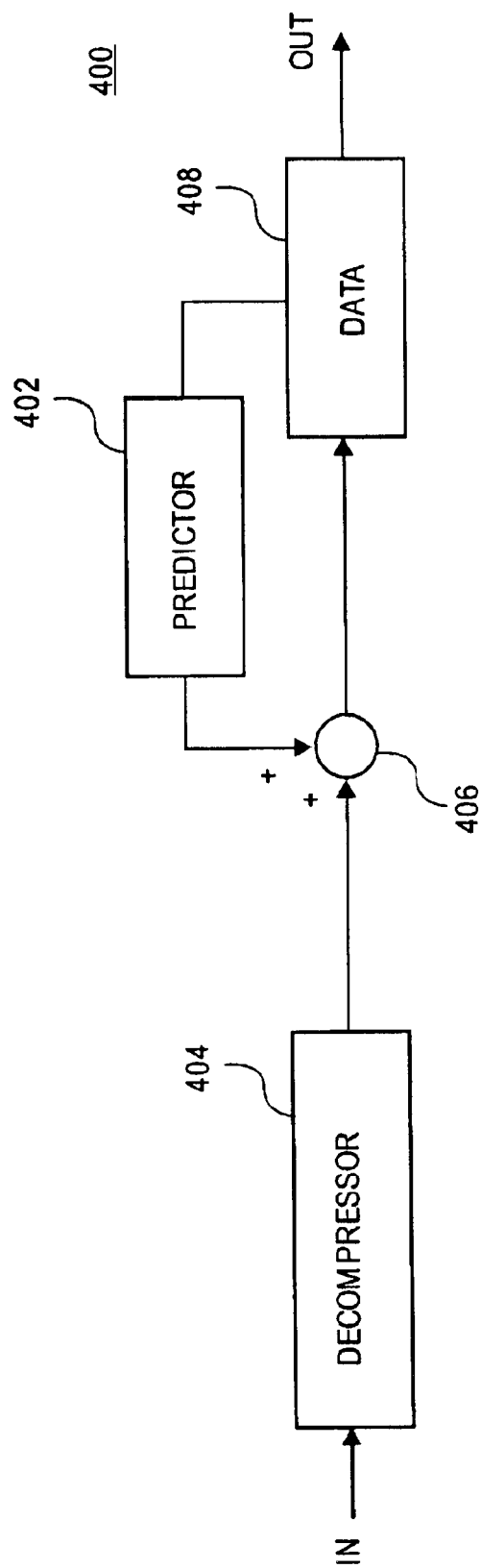
FIG. 4 is a block diagram of a decompression machine configured in accordance with one embodiment of the present invention.

FIG. 4 shows a decompression machine 500 that is a counterpart of the compression machine. For each segment in the example above, decompression machine 500 rebuilds the values listed on the right hand side of the table above. The selected vertex (vertex 1) (5, 20, 25) is stored in the predictor 502. Decompression 504 retrieves the coordinates from the compressed list and stores it in data unit 508. Predictor 502 receives coordinates (0.5, 0, 1), and adds the coordinates to vertex 1 to generate vertex 2 (5.5, 20, 26). A copy of vertex 2 is then stored back in predictor 502. The next retrieved coordinate (0.5, 1, 0.5) is added to vertex 2 to generate vertex 3 (6, 21, 26.5), a copy of which is stored in the predictor 502. The process is repeated until the values on the right side of the Table 1 is regenerated. Using the point P value for the segment, the original coordinates as existed in the vertex pool can be recreated to generate, in this instance, the segment of the cylinder. Similar operation is performed on the remaining segments to create the whole cylinder.

Figure 5:
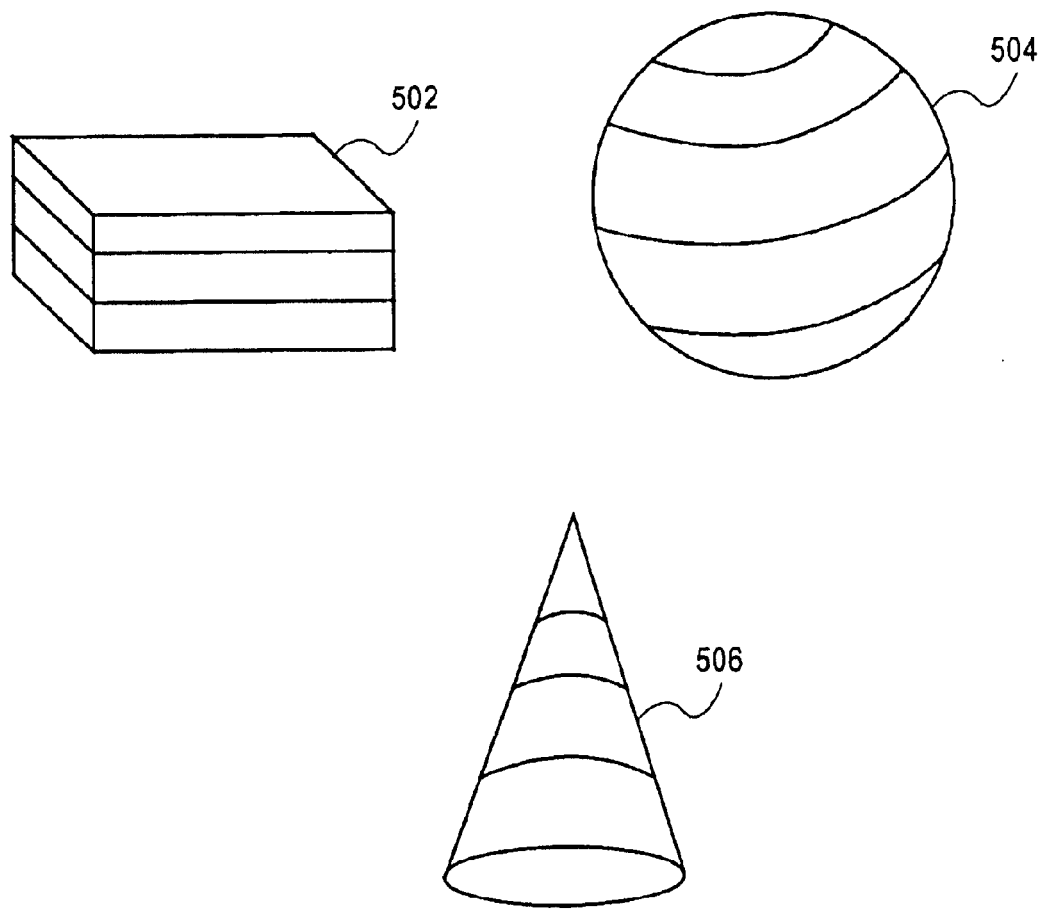
FIG. 5 is a diagram with other 3D objects on which the compression/decompression machine may operate.
Figure 6:
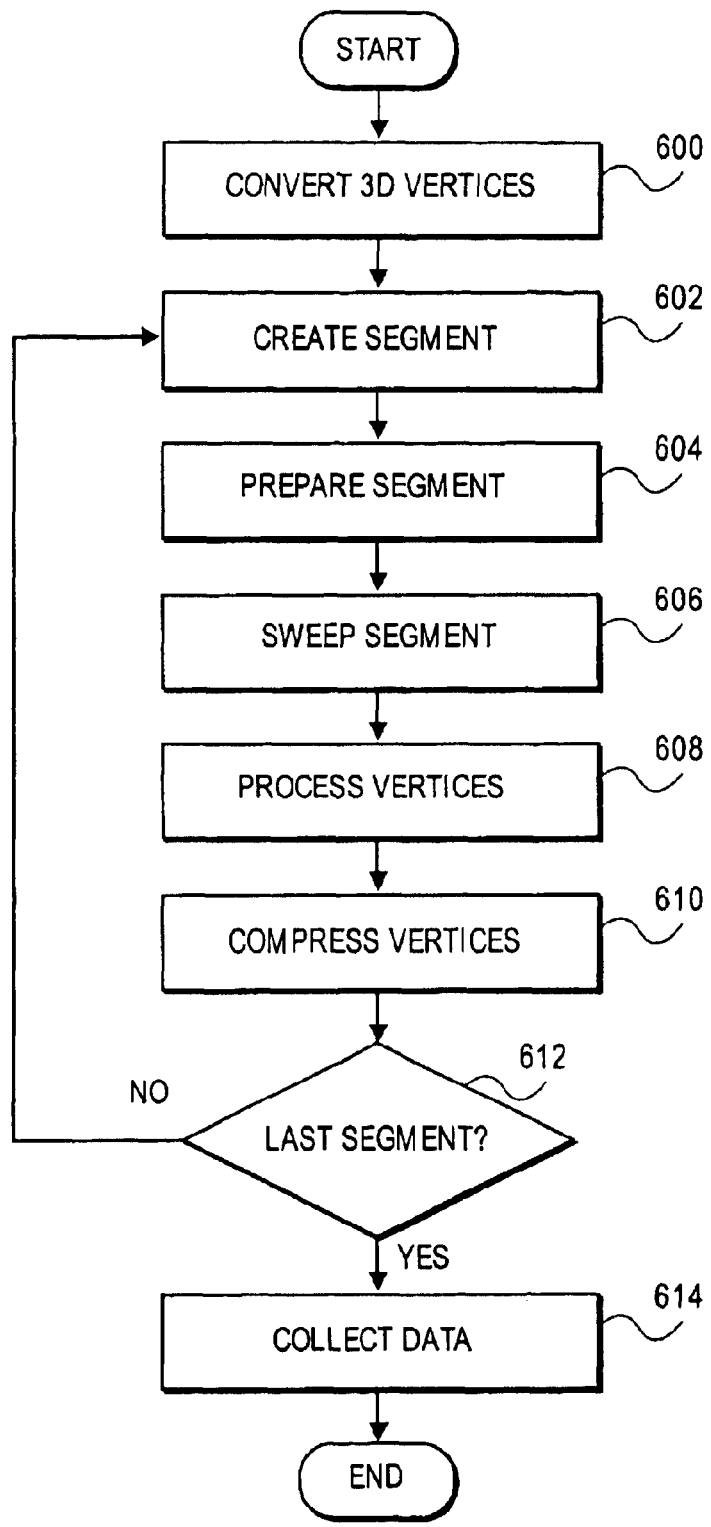
FIG. 6 is a flow diagram illustrating one mode of operation of the compression machine of FIG. 1 in accordance with one embodiment of the present invention.

FIG. 5 illustrates other objects that may be operated on by the compression/decompression system of the current invention. This includes a block 502, a sphere 504, and a cone 506. Other objects that are not illustrated may be compressed/decompressed using the present invention. Also, complex objects may be created using combinations of various objects. For example, FIG. 6 is a flow diagram illustrating the operation of compression machine 100 in accordance with one embodiment of the present invention.

In block 600, the system converts the 3D vertex pool from floating point values into integer values with sufficiently high number of bits. In one embodiment, a value of 64 bits for the highest number is proposed. After the 3D vertices have been converted, operation continues with block 602.

In block 602, the surface is decomposed into various segments ("segmented"). In one embodiment, the segmenting must be performed such that every segment must have a point P in space from which the complete surface segment can be seen. For example, no obstructions may be allowed from any part of the surface segment to any other part of the same segment. From this point P, for any direction of the point, the dr/dangle is set within a limit. dr/dangle is defined as the gradient of the local radius of the surface from the point P over any angular direction.

In block 604, the segments are then treated separately. Each segment is analyzed with its respective point P. First the segment is translated such that the point P is located in the origin of the 3-D space. Then, the segment is rotated in such a way that there exists one surface point of the segment on the X-axis of the coordinate system. The integral along the longitude (full 360°) at the equatorial plane produces the highest value for all possible rotations.

In block 606, predictor 112 sweeps the surface in longitudinal slices. The slice width is determined a priori according to some criteria like total number of points in the surface segment or other statistical data.

In block 608, whenever the sweep encounters a vertex its position is recorded in terms of r, longitude and latitude as a difference of the position of the last vertex scanned.

In block 610, encoder/compressor 116 applies a lossless compression algorithm to the data produced in block 608. The compression occurs as the probability of values occurring that are close to 0 are much higher than $2^{64}$. Therefore an average much less than 64 bits are required to represent each data point. The translation and rotation information is then prepended to the set data so that decompression machine 500 may restore the surface segment to the proper position.

In block 612, it is determined whether all surface segments have been processed. If all segments have been processed, operation continues with block 604. Otherwise, operation continues with block 614.

In block 614, once all surface segments have been processed, they are collected together in one data set with appropriate formatting for later decoding.

Figure 7:
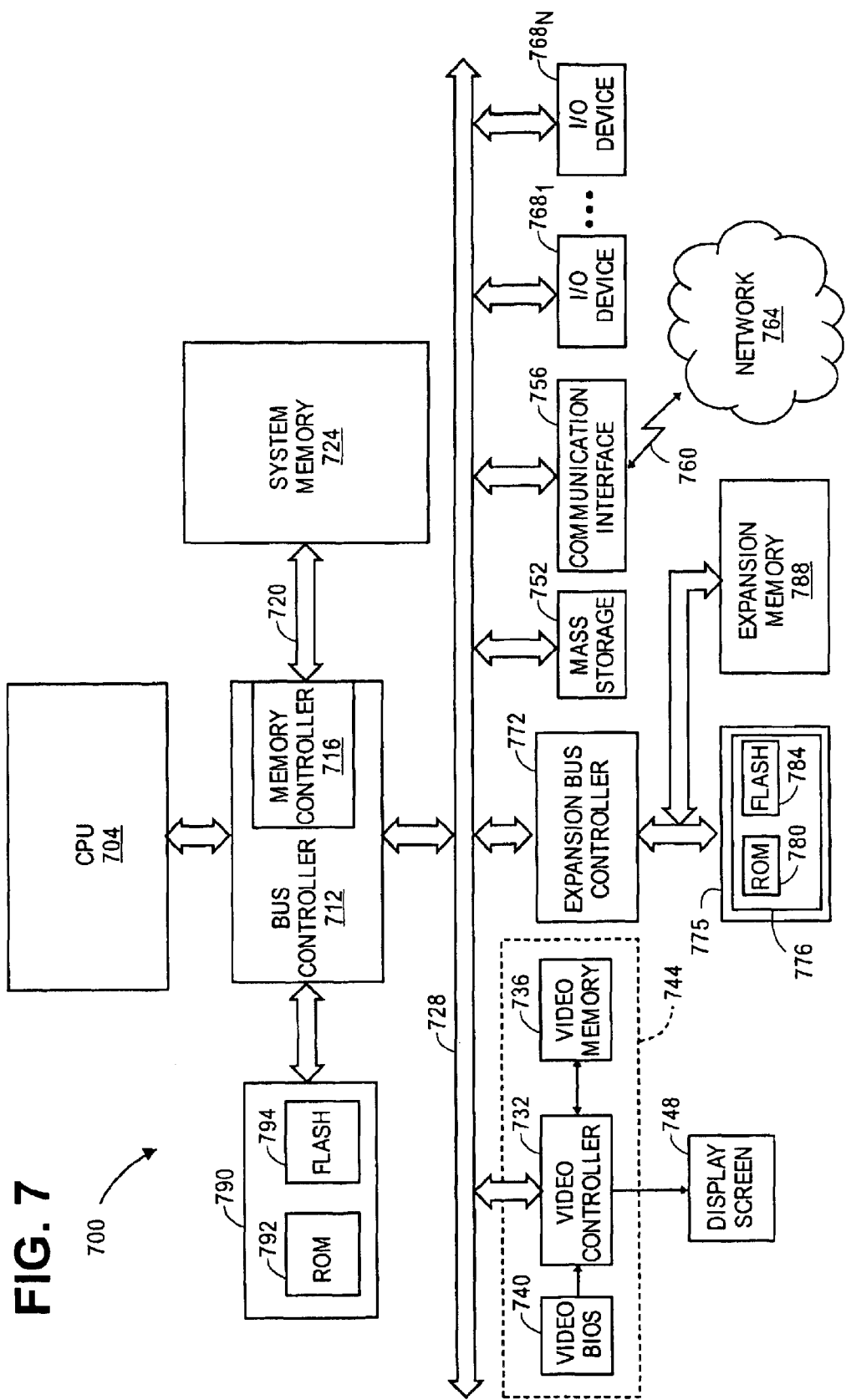
FIG. 7 is a block diagram of a computer system configured in accordance with one embodiment of the present invention.

FIG. 7 illustrates a computer system 700 that may be used to implement embodiments of the present invention. Computer system 700 includes a central processing unit (CPU) 704. CPU 704 includes an Arithmetic Logic Unit (ALU) for performing computations, a collection of registers for temporary storage of data and instructions, and a control unit for controlling operation for the system 700. In one embodiment, CPU 704 includes any one of the x86, and Pentium™ series microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680x0 processor as marketed by Motorola™m; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 704. CPU 704 is not limited to microprocessor but may take on other forms such as microcontrollers, digital signal processors, reduced instruction set computers (RISC), application specific integrated circuits, and the like. Although shown with one CPU 704, computer system 700 may alternatively include multiple processing units.

CPU 704 is coupled to a bus controller 712 by way of a CPU bus 708. Bus controller 712 includes a memory controller 716 integrated therein, although memory controller 716 may be external to bus controller 712. Memory controller 716 provides an interface for access by CPU 704 or other devices to a system memory 724 via a memory bus 720. In one embodiment, system memory 724 includes synchronous dynamic random access memory (SDRAM). System memory 724 may optionally include any additional or alternative high speed memory device or memory circuitry. Bus controller 712 is coupled to a system bus 728 that may be a peripheral component interconnect (PCI) bus as defined by Version 2.2 of the PCI Standards Committee, Industry Standard Architecture (ISA) bus as defined in Institute of Electrical and Electronic Engineers (IEEE) standard P996, which may be obtained from: IEEE Standards Office 445 Hoes Lane, Piscataway, N.J. 08854 Coupled to system bus 728 are a graphics controller, a graphics engine or a video controller 732, a mass storage device 752, a communication interface device 756, one or more input/output (I/O) devices $768_1$–$768_N$, and an expansion bus controller 772. Video controller 732 is coupled to a video memory 736 (e.g., 8 Megabytes) and a video BIOS 740, all of which may be integrated onto a single card or device, as designated by numeral 744. Video memory 736 is used to contain display data for displaying information on a display screen 748, and video BIOS 740 includes code and video services for controlling video controller 732. In another embodiment, video controller 732 is coupled to CPU 704 through an Advanced Graphics Port (AGP) bus (not shown).

A mass storage device 752 may include, but is not limited to, one or more hard disks, floppy disks, CD-ROM's, DVD-ROM's, tape drives, high density floppy disks, high capacity removable media, low capacity removable media, solid state memory devices, and combinations thereof. In addition, mass storage device 752 may include any other mass storage medium. A communication interface device 756 includes devices such as a network card or a modem interface for accessing a network. I/O devices $768_1$–$768_N$ include devices such as keyboards, mice, audio/sound cards, printers. Expansion bus controller 772 is coupled to a nonvolatile memory 775 that includes a system firmware 776. System firmware 776 includes a system BIOS 782, which is for controlling, among other things, hardware devices in computer system 700. System firmware 776 also includes a ROM 780 and a flash memory 784. Expansion bus controller 772 is also coupled to an expansion memory 788 having RAM, ROM, and/or flash memory (not shown). Computer system 700 may additionally include a memory module 790 that is coupled to bus controller 712. In one embodiment, memory module 790 comprises a ROM 792 and flash memory 794.

As is familiar to those of ordinary skill in the art, computer system 700 further includes an operating system (OS) (not shown) and at least one application program, which in one embodiment are loaded into system memory 724 from mass storage device 752 and launched during the operation of computer system 700. The OS may include any type of OS including, but not limited or restricted to, Microsoft DOS, Microsoft Windows™ (e.g., Windows 95™, Windows 98™, Windows NT™), Unix, Linux, and IBM OS/2. In general, the operating system is a set of one or more programs that control the operation of computer system 700 and the allocation of resources. An application is a set of one or more programs that performs tasks as desired by the user. In one embodiment, the application is configured to provide the functionality of the present invention.

In accordance with the practices of persons skilled in the art of computer programming, the present invention is described below with reference to symbolic representations of operations that are performed by computer system 700, unless indicated otherwise. Such operations are sometimes referred to as being computer-executed. It will be appreciated that operations that are symbolically represented include the manipulation by CPU 704 of electrical signals representing data bits and the maintenance of data bits at memory locations in system memory 724, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments may be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an EROM, a floppy diskette, a CD-ROM, an optical disk, a hard disk, a fiber optic medium, or a radio frequency (RF) link. The computer data signal may include any signal that can propagate over a transmission medium such as electronic network channels, optical fibers, air, electromagnetic, or RF links. The code segments may be downloaded via computer networks such as the Internet.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   decomposing a 3D graphics object into a set of segments, where each segment has a plurality of faces, each face having a normal vector, wherein there is a point in space, for each segment, at which a plurality of normal vectors of that segment converge;
   for each segment, extracting a set of vertex coordinates from a previously determined set of vertex coordinates to produce a set of encoded vertex coordinates; and
   for each segment, compressing a plurality of said set of encoded vertex coordinates.

2. The method of claim 1 further comprising, prior to decomposing the graphics object, converting a set of vertices for the graphics object from a floating-point to an integer representation.

3. The method of claim 1 wherein the compression uses a lossless compression scheme.

4. The method of claim 2 wherein the extraction for each segment includes sweeping a surface of the segment in longitudinal slices.

5. The method of claim 3 wherein the compression scheme is Huffman coding.

6. The method of claim 1 wherein the graphics object is one of a cylinder, a sphere, and a cone, and the segments are cylindrical.

7. An apparatus comprising:
   means for decomposing a 3D graphics object into a set of segments each having a plurality of faces, each face having a normal vector, wherein each segment has a convergence point in space at which a plurality of normal vectors of the segment converge;
   means for translating the convergence point of each segment to an origin of a 3D coordinate system;
   means for rotating each segment so that a surface point of the segment is on an axis of the coordinate system and an integral along the longitude at the equatorial plane produces a highest value for all possible rotations;
   means for extracting a set of vertex coordinates from each segment;
   means for subtracting the extracted set of vertex coordinates from a previously determined set of vertex coordinates of that segment to produce a set of encoded vertex coordinates for that segment; and
   means for compressing a plurality of said set of encoded vertex coordinates for each segment.

8. The apparatus of claim 7 further comprising means for converting a set of vertices of each segment from a floating point to an integer representation.

9. The apparatus of claim 7 wherein the extraction means includes means for sweeping a surface of each segment in longitudinal slices.

10. The apparatus of claim 8 wherein the integer representation is 64 bits.

11. An article of manufacture comprising:
    a machine readable medium having code stored thereon that, when executed by a processor, causes a system to slice a 3D graphics object into a set of segments such that for each segment there is a point P in space from which a complete surface of that segment can be seen, and for each segment, sweep a surface of the segment until a vertex in a 3D vertex pool of the graphics object is encountered, record a position of the encountered vertex in relation to a recorded position of a previously encountered vertex, and apply a compression scheme to the recorded positions.

12. The article of manufacture of claim 11 wherein the machine readable medium has code that causes vertices of the graphics object to be converted from a floating-point to integer representation.

13. The article of manufacture of claim 11 wherein the machine readable medium has code that causes the surface of each segment to be swept in longitudinal slices.

14. The article of manufacture of claim 11 wherein the machine readable medium has code that causes the system to determine a plurality of 3D graphics objects depicted in a 3D image and store coordinate information as to the location of the plurality of objects so that the objects may be placed in their original positions during reconstruction of the image, and wherein the machine readable medium has further code that causes the system to perform the slicing, sweeping, recording and compression operations on each of the plurality of objects separately.

15. The article of manufacture of claim 11 wherein the machine readable medium has code that causes the system to translate each segment such that the point P of each segment is located at the origin of a 3D coordinate space, prior to sweeping the surface of the segment.

16. The article of manufacture of claim 15 wherein the machine readable medium has code that causes the system to rotate each segment until a surface point of the segment is on an axis of the coordinate system and an integral along the longitude at the equatorial plane produces a highest value for all possible rotations.

17. An apparatus comprising:

a predictor to determine the shape of a 3D image and based on the determined shape operate in a selected 3D coordinate system; and an encoder/compressor, to decompose the image into a set of segments, each segment having a plurality of faces, each face having a normal vector, wherein each segment has a convergence point in space at which a plurality of normal vectors converge, the encoder/compressor to treat each segment separately for purposes of data compression, translate the convergence point of each segment to an origin of the selected 3D coordinate system, rotate each segment so that a surface point of the segment is on an axis of the coordinate system and an integral along a longitude at the equatorial plane produces a highest value for all possible rotations, the encoder/compressor to extract a vertex from each segment, subtract the vertex from a previously determined vertex of that segment to produce an encoded vertex for that segment, the encoder/compressor to compress a plurality of said encoded vertices of each segment.

18. The apparatus of claim 17 wherein the predictor is to convert a 3D vertex pool of the image from floating point into integer representation for use by the encoder/compressor.

19. The apparatus of claim 17 wherein the predictor and the encoder/compressor are implemented by a programmed processor, the apparatus further comprising a bus to which the programmed processor is coupled, and a communication interface device coupled to the bus to receive the compressed plurality of encoded vertices of each segment.

20. The apparatus of claim 19 wherein the communication interface device is one of a network card and a modem interface for accessing a network.

\* \* \* \* \*